United States Patent [19]

Cohen

[11] 3,757,200

[45] Sept. 4, 1973

[54] MOS VOLTAGE REGULATOR

[75] Inventor: Burton E. Cohen, Huntington Station, N.Y.

[73] Assignee: General Instrument Corporation, Newark, N.J.

[22] Filed: July 10, 1972

[21] Appl. No.: 270,276

[52] U.S. Cl. .................................. 323/8, 323/22 R

[51] Int. Cl. .............................................. G05f 1/60

[58] Field of Search ................ 307/297, 304; 323/4, 323/8, 16, 22 R

[56] References Cited

UNITED STATES PATENTS

| | | | |
|---|---|---|---|
| 3,614,479 | 10/1971 | Nelson | 307/297 |
| 3,384,792 | 5/1968 | Kazan et al. | 323/16 UX |
| 3,678,293 | 7/1972 | Popper | 307/304 X |
| 3,700,981 | 10/1972 | Masuhara et al. | 307/304 X |

OTHER PUBLICATIONS

IBM Technical Disclosure Bulletin, Vol. 13, No. 9, Feb. 1971, pages 2516 and 2659.

Electronics, G. B. Herzog, "Cos/Mos: The Best of Both Worlds," Feb. 17, 1969, Pages 110, 111.

*Primary Examiner*—A. D. Pellinen
*Attorney*—Maxwell James et al.

[57] ABSTRACT

A voltage regulator circuit for use in integrated microcircuits which may be integrated directly on the semiconductor chip and is adapted to limit increases in the external supply voltage above that required for effective circuit operation, thereby to limit the increased current and power that would ordinarily result. The circuit comprises a resistor operatively connected in series with a switching device across the supply voltage to form a ratio circuit, the output of which is fed through a feedback amplifier to the control terminal of the switching device. The resulting negative feedback is effective to bias the output in a direction opposed to increases in the external voltage supply. A capacitor may be operatively connected to the output to prevent circuit oscillation.

13 Claims, 1 Drawing Figure

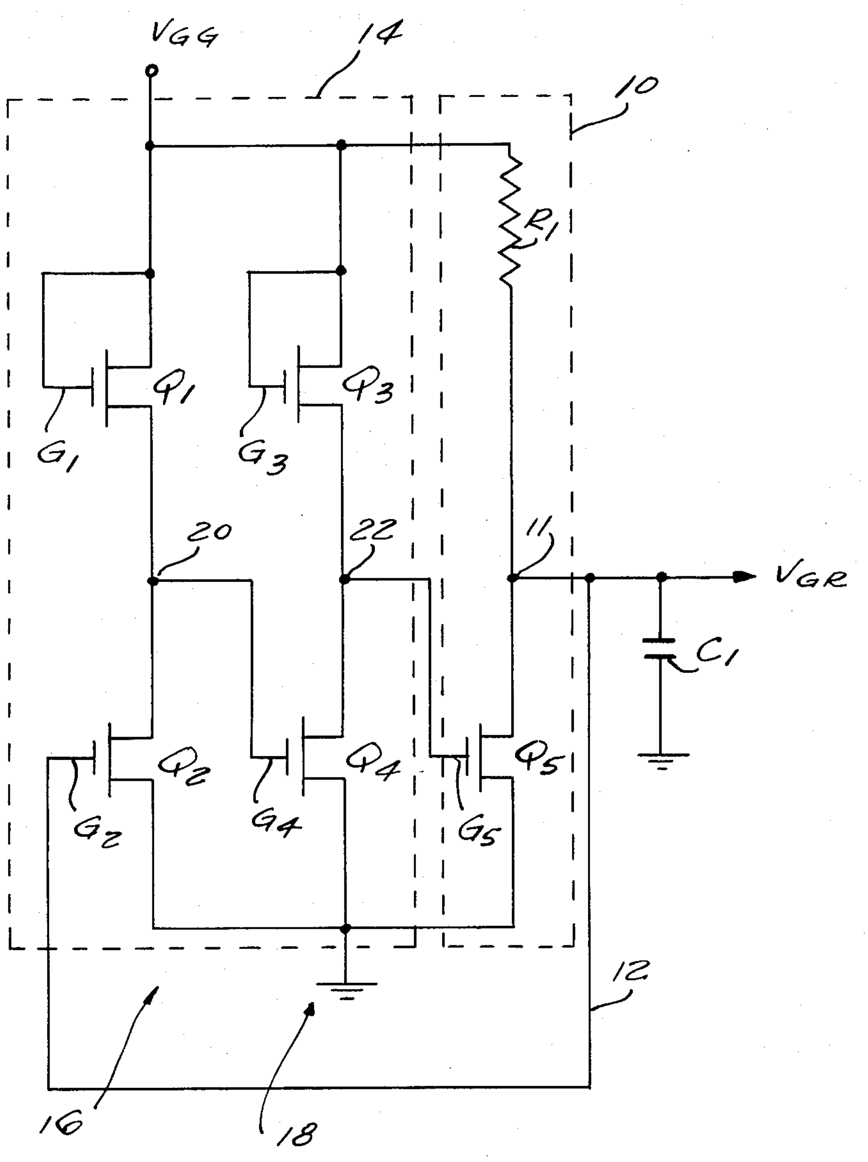
VGG
14
10
R1
Q1
Q3
G1
G3
20
22
11
VGR
C1
Q2
Q4
Q5
G2
G4
G5
12
16
18

MOS VOLTAGE REGULATOR

The present invention relates to integrated logic circuitry and more particularly to an MOS voltage regulator circuit which may be integrated directly on a semiconductor chip.

Logic circuits are the basic building blocks of the central processing sections of computers and other digital data and communications equipment. These circuits are designed to perform logical operations upon binary data and to transfer that data to and from the data storage sections of the computer by means of switching devices which ideally exist in only two possible states. The data is generally converted into electrical signals which assume one of two possible voltage levels representing the binary logic "0" and logic "1" states. The switching devices in turn are controlled by the data signals thereby to perform logical operations and/or to transfer the data through the system.

In modern digital equipment, logic circuits of this type typically comprise a plurality of semiconductor switching devices integrated on a chip of semiconductor material. In recent years, integrated circuits of this type have increasingly utilized insulated gate field effect transistors (IGFETs) and particularly those of the metal oxide silicon (MOS) type. These transistors are formed on a chip of semiconductor material by performing appropriate operations on suitably doped regions of the individual field effect devices. These elements include a control terminal generally termed the gate, and a pair of output terminals generally termed the source and drain, respectively. In a typical P-type enhancement mode MOSFET, if the signal at the gate is sufficiently negative with respect to its source terminal, the output circuit between the source and drain is closed, that is, the device is rendered conductive or "on." Conversely, if the signal at the gate is not sufficiently negative with respect to the source terminal, the output circuit is characterized by an extremely high impedance equivalent to an open circuit, and the device is rendered nonconductive or turned "off." Accordingly, MOSFETs of this type operate as high speed switching devices controlled by the signal level applied to their gate terminals. The potential difference between source and gate at which switching occurs defines the threshold voltage ($V_T$) of a MOSFET.

These devices, by virtue of their extremely small size, low power requirement and ease of fabrication in large quantities, are extremely well suited for the mechanization of complex logic functions using large scale integrated circuit techniques on a single substrate of semiconductor material. In addition, these devices have been found to give consistently higher processing yields than today's bipolar technology.

For purposes of explanation throughout this specification a logic "0" signal level refers to a level sufficient to turn a field effect device fully off when applied at its gate terminal and a logic 1 signal level designates a level sufficient to turn a device fully on when applied to its gate terminal.

In a typical MOS logic circuit of the type described above, the operative logic levels are established by means of an externally supplied negative reference voltage. That voltage is typically well above the threshold level of MOS devices and accordingly defines the logic 1 condition, the logic 0 condition being defined by ground. The reference voltage is generally supplied to the semi-conductor chip through a conductive pin which extends from the integrated circuit package.

Typically in the operation of MOS logic circuits, data is stored at successive circuit nodes which are adapted to be charged from the external supply voltage through an MOS load resistor having its gate and drain tied to the external supply and to be conditionally discharged to ground via a second MOS device (considerably less resistive and known as the driver) connected in series with the load device between the external supply and ground. Alternatively the load resistor may be rendered conductive by the application of an additional (more negative) supply voltage at its gate terminal. In either event, that conditional discharge operation is a function of the input signal to the gate of the MOS driver. When that data signal is at logic 1 (negative) the device is conductive and substantial current is drawn through the load resistor drawing the operative circuit node toward ground (logic 0).

As is well known, the current through an MOS field effect transistor is a function of the square of the voltage applied to its gate. It will therefore be appreciated that even small (negative) increases in the external voltage supply applied to the gate of the load device will result in substantial increases in current and thus a substantially increased power dissipation. It is therefore quite important that the reference voltage level be maintained as low as possible consistent with the logic level requirements of the circuit. Unfortunately, it has been found that substantial variations in the external supply voltage (used by the customer) are quite unavoidable. Moreover, integrated circuits of the type described are generally mass produced for sale and distribution to customers having a variety of power supplies (both in terms of rated voltage level and regulation).

As a result, it has been found necessary to design such circuits for successful operation with power supplies having a large voltage spread to levels considerably above the minimum level or levels required for effective high speed logic switching. When operated at such higher levels, considerable power is wasted.

It is therefore a primary object of the present invention to provide an MOS circuit adapted to operate as a voltage regulator which may be integrated directly on the semiconductor chip and is adapted to minimize the normal voltage spread of the externally generated supply voltage, thereby to considerably reduce the amount of power dissipated on the chip.

It is yet another object of the present invention to provide a voltage regulator circuit of the type described which is inexpensive to fabricate, dissipates little power and may be integrated on a minimum of chip space.

To these and other objects, the present invention provides a semiconductor MOS circuit which operates as an "on-the-chip" voltage regulator to provide a relatively constant output voltage for use as a gate bias. Variations in the external supply voltage are minimized in accordance with the present invention by means of a regulator stage having a feedback amplifier adapted to negatively bias the output in a direction opposing changes at the input. The ratio circuit comprises a resistor connected in series with a MOSFET, the output of which is operatively connected to a multistage amplifier circuit, each stage of which comprises a pair of MOSFETs connected in series between the supply voltage and ground. These stages function in a conventional manner as ratio or inverter stages, the upper or load device having its gate returned to its drain and thus being continuously conductive, whereby the output taken off the junction between the two devices is a function of the signal applied to the gate of the lower or driver device. The driver device of each stage receives the output signal of the previous stage at is gate terminal, the output of the last stage being applied to the input of the regulator stage. As a result, as the external supply voltage rises above its minimum effective value, the resulting increased drive on the regulator stage of the circuit compensates for that rise and results in a considerably smaller rise at the output. The output quickly stabilizes when driving large loads but may be provided with an additional capacitor to insure against oscillation.

The regulator voltage output of the network is adapted to provide the gate bias for a typical MOS microcircuit, whereby the resistivity of those devices remains relatively constant and current and power increases in response to increases in the supply voltage are substantially minimized.

To the accomplishment of the above and to such other objects as may hereinafter appear, the present invention relates to an MOS voltage regulator circuit as defined in the appended claims and as described herein in connection with the accompanying drawing which is a schematic circuit diagram of the voltage regulator circuit of the present invention.

As shown in the drawing, in the embodiment here specifically described, the voltage regulator circuit of the present invention comprises a regulator stage 10 comprising a resistor R1 connected in series with the output circuit of a FET switching device Q5 between the external voltage supply here designated $V_{GG}$ and ground. (The resistor R1 preferably comprises a P-region of appropriate dimensions formed directly on the semiconductor chip but other possibilities such as a MOSFET having its gate tied to its drain will be apparent.) It will be appreciated at the outset that while the circuit is herein described in connection with a $V_{GG}$ supply conventionally externally generated and supplied to the semiconductor chip for use as a gate bias voltage, the voltage generator herein described, in its broadest aspects, is applicable to a variety of environments in which on-the-chip voltage regulation is required or desired.

The regulated output signal $V_{GR}$ appears at the output node 11 of regulator stage 10 defined at the junction between resistor R1 and FET Q5 and is returned via feedback path 12 through an amplifier generally designated 14 at the gate terminal G5 of the switching FET Q5. Accordingly, as will hereinafter be described in more detail, the current through the series connection of resistor R1 and FET Q5 is regulated in response to the voltage level $V_{GR}$ at output node 11 in a manner effective to minimize increases in $V_{GR}$ in response to an increasing external voltage level $V_{GG}$. More particularly, as is well known, the voltage level established at a junction node, such as output node 11, is a function of the ratio of effective resistances at either side of the junction. Thus for example, if the gate G5 of FET Q5 is initially at a positive (logic 0) level, FET Q5 will present substantially infinite resistance to the flow of current and node 11 will be charged to a voltage level $V_{GR}$ substantially equal to the supply voltage $V_{GG}$ whereupon current through resistor R1 will cease. If the voltage supply level $V_{GG}$ increases (negatively), node 11 will be correspondingly charged more negatively and that increase in voltage level is fed via feedback path 12 through amplifier 14 to the gate terminal G5 of FET Q5 which in turn will be rendered more conductive. That increase in conductivity of FET Q5 will be effective to draw additional current through the series connection of resistor R1 and FET Q5, thereby to provide a larger voltage drop across resistor R1 to draw the voltage level at node 11 closer to ground. Accordingly, increases in the external voltage supply level $V_{GG}$ are automatically compensated for in accordance with the circuit here described by providing a negative bias signal at the gate G5 of FET Q5.

Amplifier 14 may comprise any one of a number of well known amplifier configurations but as here specifically described in a preferred embodiment comprises a multistage MOS amplifier, each stage comprising a ratio or inverter circuit of the type described above.

In the embodiment here specifically illustrated, the amplifier 14 comprises two stages 16 and 18, respectively. Stage 16 comprises FETs Q1 and Q2 having their output circuits connected in series between the $V_{GG}$ supply and ground while stage 18 comprises FETs Q3 and Q4 having their output circuits operatively connected in series between the $V_{GG}$ supply and ground. The gate terminals G1 and G3 of FETs Q1 and Q3 are returned to the $V_{GG}$ supply whereby those FETs function as load resistors. The gate terminal $G_4$ of FET $Q_4$ is operatively connected to the junction node 20 between FETs Q1 and Q2 of stage 16 while the gate G2 of FET Q2 is operatively connected to the feedback line 12 and receives the output signal $V_{GR}$ at output node 11. The gate G5 of FET Q5 is operatively connected to junction node 22 at the junction between FETs Q3 and Q4.

The operating characteristics of devices Q1–Q5 and R1 are preferably chosen, in accordance with the present invention, such that the circuit will stabilize with an output voltage level $V_{GR}$ comprising the minimum voltage level effective to provide sufficient gate bias to the microcircuit (not shown) for performing the required high speed logic switching functions. That value should of course be not less than the lowest expected value of the external supply voltage $V_{GG}$. The resistance ratios of FETs Q1 and Q2 and FETs Q3 and Q4 are preferably adjusted such that when $V_{GG}$ is at its lowest value, FET Q5 is biased along its characteristic curve to a point just at cutoff. Accordingly, node 11 is charged to a level $V_{GR}$ substantially equal to the lowest level of $V_{GG}$. As $V_{GG}$ becomes more negative, node 11 is charged more negatively and accordingly the gate G2 of FET Q2 is correspondingly biased more negatively via feedback line 12. As a result, junction node 20 is drawn closer to ground and the gate G4 of FET Q4 is rendered less conductive causing junction node 22 to be charged more negatively. The resulting increased negative drive on the gate G5 of FET Q5 is effective to compensate for the rise in voltage supply $V_{GG}$, and results in a much smaller rise in the output signal $V_{GR}$ at node 11.

Care must be taken in the design of the circuit to prevent undue oscillation. In this regard, a discrete capacitor C1 may be operatively connected between the output and ground to insure circuit stability by providing the feedback amplifier with a roll-off characteristic sufficient to prevent oscillation. The size of the capacitor required will depend upon the capacitive load driven by $V_{GR}$. (When driving large loads, capacitor C1 may not be necessary.)

The regulator voltage output $V_{GR}$ is preferably used to provide gate bias for a typical microcircuit, thereby to limit the increased current and power that would ordinarily result when the external power supply $V_{GG}$ rises (negatively) above the level required for effective switching. It will be noted that the voltage regulation provided by the circuit described herein requires current flow through resistor R1. However, the power associated with this regulator current is negligible when compared with the power saved by such regulation.

While only a single embodiment of the present invention has been herein specifically described, it will be apparent that many variations may be made therein, all within the scope of the invention, as defined in the following claims.

I claim:

1. A voltage regulator circuit integrated on a semiconductor substrate for regulating an external voltage supplied to a semiconductor integrated circuit comprising a resistor, a semiconductor switching device having an output circuit operatively connected in series with said resistor across said external voltage supply and having a control terminal, an output node at the junction of said resistor and said semiconductor switching device, a feedback amplifying means operatively connected between said output node and the control terminal of said semiconductor switching device and effective to increase the conductivity of said semiconductor switching device in response to an increase in the voltage level at said output node, whereby increases in the level of said external voltage supply are compensated by an increase in the voltage across said resistor, wherein said feedback amplifying means comprises a multistage circuit, each stage comprising a load device and a semiconductor switching device having an output circuit operatively connected in series with said load device and a control terminal operatively connected to the junction node at the junction between the load device and the semiconductor switching device of the previous stage.

2. The voltage regulator circuit of claim 1, wherein said amplifier switching devices are field effect transistors.

3. The voltage regulator circuit of claim 2, wherein said load defices are field effect transistors.

4. The voltage regulator circuit of claim 1, wherein said feedback amplifying means is operatively connected to said external voltage supply.

5. The voltage regulator circuit of claim 4, wherein each stage of said feedback amplifying means is connected across said external voltage supply.

6. The voltage regulator circuit of claim 1, wherein said switching device is a field effect transistor.

7. The voltage regulator circuit of claim 6, wherein said resistor comprises an impurity diffused region on said semi-conductor substrate.

8. The voltage regulator circuit of claim 6, wherein said amplifier switching devices are field effect transistors.

9. The voltage regulator circuit of claim 8, wherein said load devices are field effect transistors.

10. The voltage regulator circuit of claim 8, wherein said resistor comprises an impurity diffused region on said semi-conductor substrate.

11. The voltage regulator circuit of claim 1, further comprising capacitive storage means operatively connected to said output node and effective to stabilize the circuit.

12. The voltage regulator circuit of claim 11, wherein said feedback amplifying means is operatively connected to said external voltage supply.

13. The voltage regulator circuit of claim 12, wherein each stage of said feedback amplifying means is connected across said external voltage supply.

* * * * *